No. 627,457.  
F. GROSS.  
CULTIVATOR.  
(Application filed Sept. 15, 1898.)  
(No Model.)  
Patented June 20, 1899.

Witnesses  
Inventor  
Frank Gross,  
by O'Meara & Co Attorneys

THE NORRIS PETERS CO., PHOTO-LITHO., WASHINGTON, D. C.

UNITED STATES PATENT OFFICE.

FRANK GROSS, OF HESPERUS, COLORADO.

CULTIVATOR.

SPECIFICATION forming part of Letters Patent No. 627,457, dated June 20, 1899.

Application filed September 15, 1898. Serial No. 690,989. (No model.)

*To all whom it may concern:*

Be it known that I, FRANK GROSS, a citizen of the United States, residing at Hesperus, in the county of La Plata and State of Colorado, have invented a new and useful Cultivator, of which the following is a specification.

This invention relates generally to cultivators, and more particularly to clod-crushing cultivators, the object of the invention being to provide a cheap and simple machine of this kind which can be quickly and easily adjusted as the condition of the soil may require.

With this object in view my invention consists in the details of construction and novelties of combination, all of which will be fully described in this specification and particularly pointed out in the appended claim.

Figure 1:
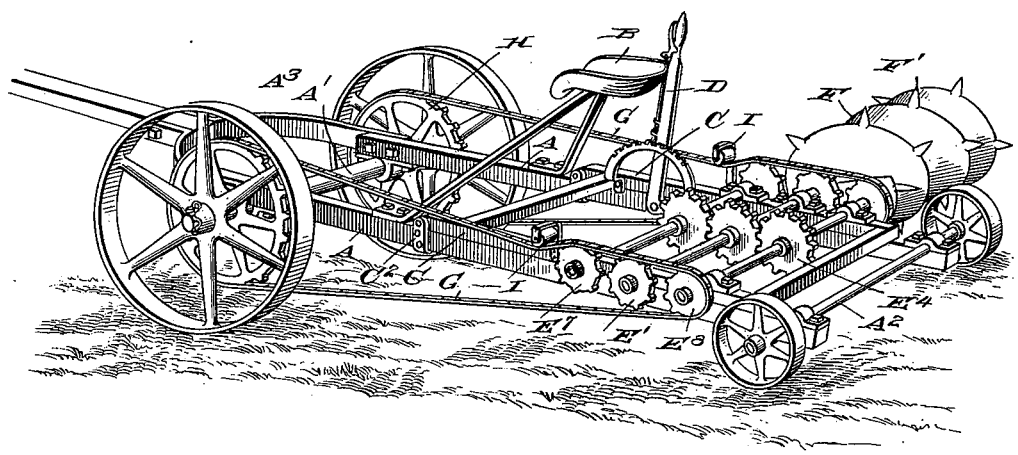
Figure 2:
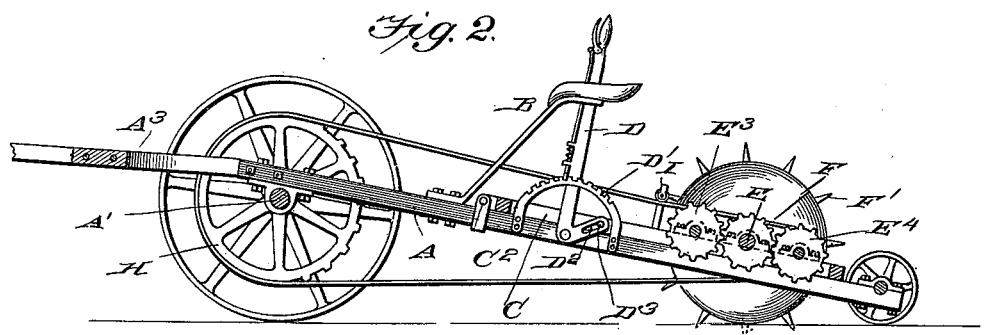
Figure 3:
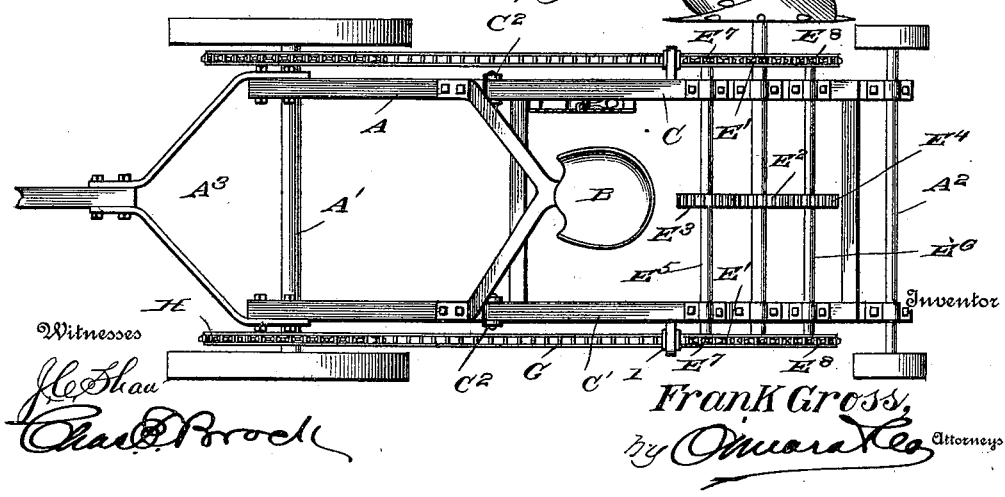

In the drawings forming part of this specification, Figure 1 is a perspective view of my improved cultivator. Fig. 2 is a longitudinal sectional view, and Fig. 3 is a top plan view.

In carrying out my invention I employ a main frame composed of side beams A, supported upon a front axle A' and a rear axle $A^2$, and a draft appliance $A^3$ is attached to the forward end of beams A. A seat B is also supported upon the main frame, as clearly shown in all the figures.

An adjustable frame is pivotally attached to the main frame slightly forward of the center, said adjustable frame being composed of side beams C and end beams C', said side beams being connected to the side beams of the main frame by means of hinges $C^2$. The adjustable frame is raised and lowered by means of an elbow-lever D, pivoted to the main frame and provided with a thumb-latch pawl, which engages a segment D', attached also to the main frame, the lever being arranged in convenient position for the driver and the short arm thereof being slotted, as shown at $D^2$, in order to allow for the motion of the pin $D^3$ when the frame is raised and lowered.

A shaft E is journaled upon the lower or rear end of the adjustable frame and carries an auger-shaped shovel or clod-crusher F, the wings thereof being provided with points F' at different intervals. In order to revolve this shaft and auger-shaped shovel or cultivating device, I arrange sprocket-wheels E' upon said shaft outside of the frame and a gear $E^2$ upon the shaft inside the frame, said gear $E^2$ meshing with gears $E^3$ and $E^4$, mounted upon shafts $E^5$ and $E^6$, carrying sprockets $E^7$ and $E^8$, over which pass the drive-chains G, driven from sprockets H, mounted upon the front axle and held into operative contact with the sprocket-wheels by means of tightening-rollers I, mounted upon the side members of the adjustable frame.

It will thus be seen that as the machine is drawn forward the agitator, crusher, or cultivator shovel is rotated and the soil broken up, and it will also be noticed that by adjusting the frame the rotary cultivator can be made to cut any depth desired.

Having thus fully described my invention, what I claim as new, and desire to secure by Letters Patent of the United States, is—

In a cultivator, the combination with a frame, of a rotary auger-shaped shovel provided with points, substantially as shown and described.

FRANK GROSS.

Witnesses:
JOHN KELLENBERGER,
FRANK H. WISE.